(No Model.) 2 Sheets—Sheet 1.
J. A. MYERS & C. ADAMS.
PLANTER.
No. 584,230. Patented June 8, 1897.
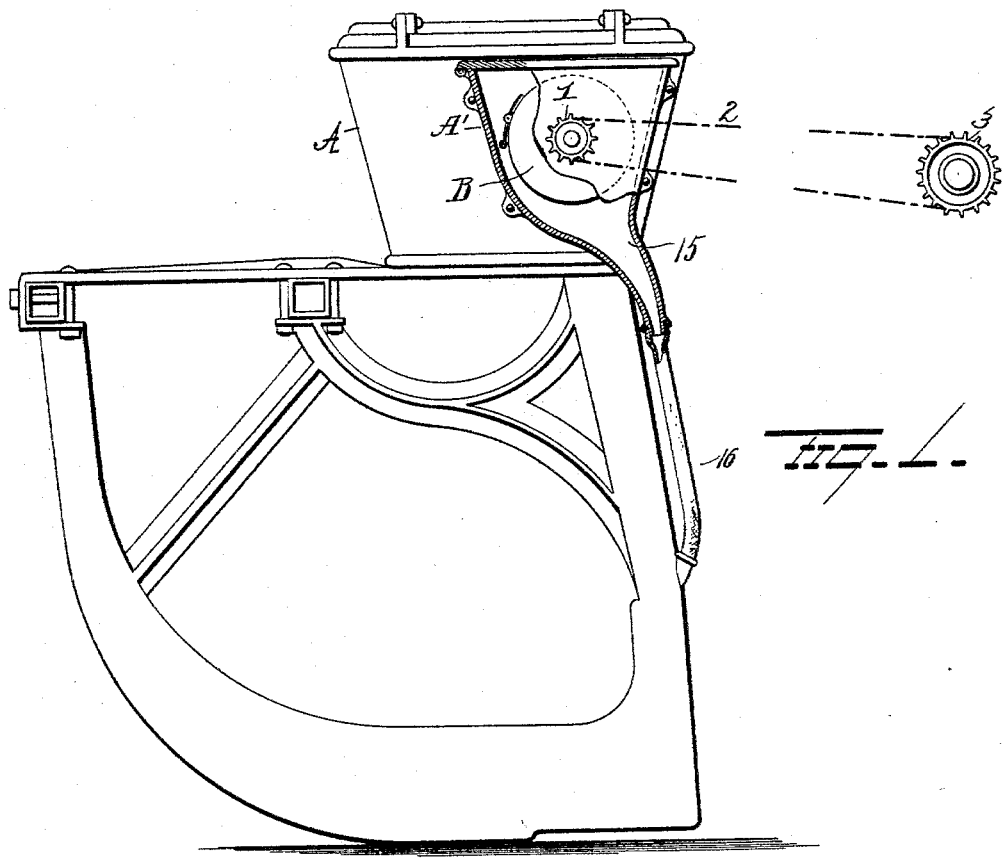
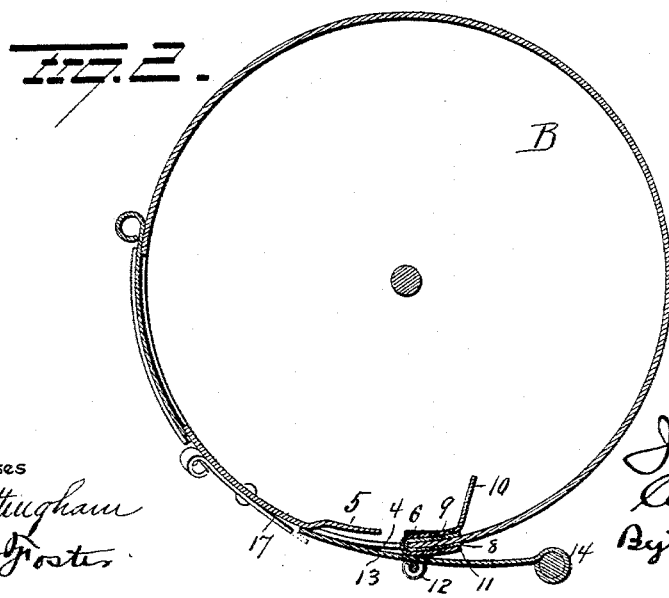
Witnesses
E. J. Nottingham
S. W. Foster
Inventors:
John A. Myers
Curtis Adams
By H. A. Seymour
Attorney

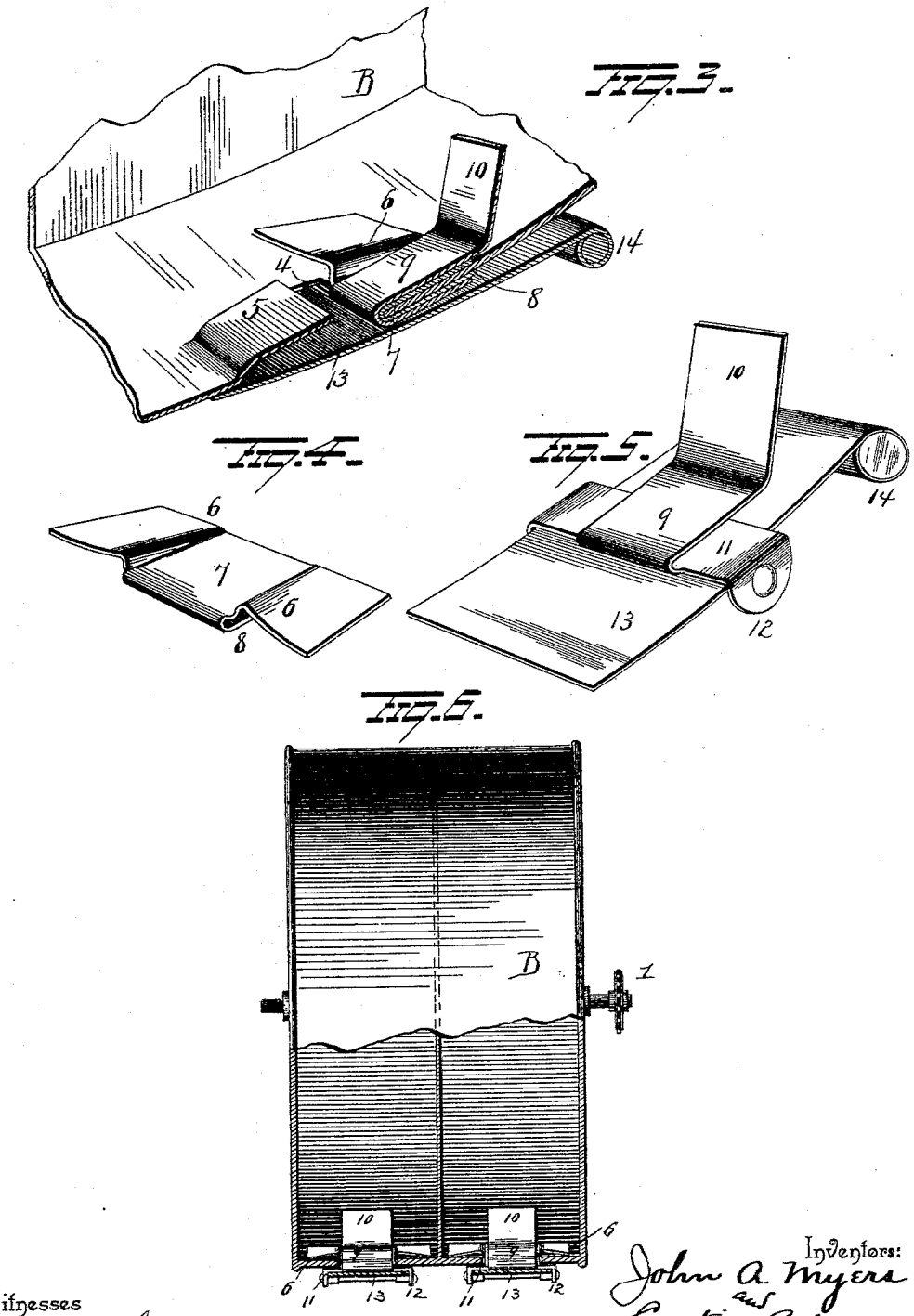

UNITED STATES PATENT OFFICE.

JOHN A. MYERS AND CURTIS ADAMS, OF NORTH ENGLISH, IOWA.

PLANTER.

SPECIFICATION forming part of Letters Patent No. 584,230, dated June 8, 1897.

Application filed June 12, 1896. Serial No. 595,317. (No model.)

*To all whom it may concern:*

Be it known that we, JOHN A. MYERS and CURTIS ADAMS, residents of North English, in the county of Iowa and State of Iowa, have invented certain new and useful Improvements in Planters; and we do hereby declare the following to be a full, clear, and exact description of the invention, such as will enable others skilled in the art to which it appertains to make and use the same.

Our invention relates to an improvement in planters, and more particularly to an improved attachment for corn-planters, the object of the invention being to construct devices which can be applied to a corn-planter whereby pumpkin or other seed can be planted simultaneously with the corn.

A further object is to produce appliances for the purpose stated which shall be simple in construction, which can be adjusted to regulate the amount of seed to be planted in each hill, and which shall be effectual in all respects in the performance of its functions.

With these objects in view the invention consists in certain novel features of construction and combinations and arrangements of parts, as hereinafter set forth, and pointed out in the claims.

In the accompanying drawings, Figure 1 is a part sectional view illustrating our invention. Fig. 2 is a sectional view. Figs. 3, 4, 5, and 6 are detail views.

A represents the corn receptacle or box of a corn-planter, and B a revoluble seed drum or receptacle mounted in a box A', attached to the box A. If desired, one end of the corn-box A can be made with a compartment for the reception of the seed-drum instead of using a separate box A'.

The drum or receptacle B is provided with a sprocket-wheel 1, to which motion is transmitted by a sprocket-chain 2 from a sprocket-wheel 3 on the axle of the planter. The drum or receptacle B might be attached to some other part of the machine, if desired, and when it is attached to the corn-receptacle, as above mentioned, we prefer to attach it at the rear upper corner of said corn-box.

The peripheral wall of the drum B is made with a seed-outlet 4, and in making this outlet the wall of the drum is cut to form a tongue 5, which is bent slightly inward and serves to prevent the seed from falling back into the drum after it has passed through the outlet. The seed will be guided to the outlet by means of a removable guide-plate 6. The guide 6 is composed of a plate bent to form a recess or trough 7 between its ends, into which recess or trough the seed will enter and be guided thereby to the outlet. Several guides 6 may be employed, having recesses or troughs of different sizes, so that one guide can be removed and replaced by another which will cause a larger or smaller number of seed to flow through the outlet at each revolution of the drum. The guide-plate 6 is provided with a lip 8, adapted to engage the end wall of the outlet, whereby to hold said guide-plate in position. A plate 9 normally rests in and in effect constitutes the bottom of the trough in the guide-plate, said plate 9 terminating in an inwardly-projecting arm 10, which serves to prevent the crowding and wedging of the seed in the outlet. The plate 9 is made at one end with a transverse bar or plate 11, which lies against the lip 8 on the guide-plate and parallel with the outer peripheral face of the drum. At its respective ends the transverse bar or plate is provided with outwardly-projecting perforated ears 12 for the reception of a transverse bolt which serves as the fulcrum for a gate 13. The gate 13 projects over the entire outlet, including the tongue 5, and the rear end of said gate is provided with a weight 14. If desired, the drum may be provided with several compartments and each compartment provided with the feeding devices above described, so that several kinds of seed can be fed simultaneously to the same hill.

From the construction and arrangement of parts above described it will be seen that as the seed-drum B revolves a few seeds will enter the outlet, at which time the outlet will be directly under the axis of the drum. As the drum continues to rotate from this position the weighted arm of the gate will cause the latter to close the outlet. The outlet will remain closed by the gate, and thus prevent the seeds behind the latter from escaping until the weighted arm of the gate shall have passed above a horizontal line passing through the axis of the drum, when the weighted arm of the gate will fall against the peripheral wall of the drum and cause the gate to be opened, resulting in the escape of the seeds which have passed through the outlet of the drum. The seed thus discharged from the drum will enter a conductor 15, formed by the bottom of box A', and from said conductor the seed will pass into a tube 16, by which latter it will be conducted to the runner of the planter and deposited in the hill with the corn. One end of the tube 16 will be secured to the conductor 15 and the other end to the shank of the runner in any suitable manner.

Slight changes might be made in the details of construction of our invention without departing from the spirit thereof or limiting its scope, and hence we do not wish to limit ourselves to the precise details herein set forth.

Our improvements are simple in construction and effectual in all respects in the performance of their functions.

Should it be desired to stop the operation of the seeder attachment, that may be readily done by locking the weighted gate by means of a latch 17.

Having fully described our invention, what we claim as new, and desire to secure by Letters Patent, is—

1. In a planter, the combination with a drum having an opening therein for the discharge of its contents, and a tongue adjacent to the opening which serves to prevent the seed from falling back into the drum after it has passed into the outlet, of a gate hinged to the drum in position to cover the opening and permit seed to pass therethrough when the drum reaches a certain position, substantially as set forth.

2. In a planter, the combination with a seed-drum having an outlet-opening formed therein, a tongue adjacent to the opening which serves to prevent the seed from falling back into the drum and which causes them to drop out when the opening is uncovered, a removable guide-plate, and a projecting arm located within the drum for preventing the seed from crowding and wedging in the outlet, substantially as set forth.

In testimony whereof we have signed this specification in the presence of two subscribing witnesses.

JOHN A. MYERS.
CURTIS ADAMS.

Witnesses:
JESSE MASON,
L. E. BROWN.